(12) United States Patent
Shen et al.

(10) Patent No.: US 12,476,925 B2
(45) Date of Patent: Nov. 18, 2025

(54) DATA FORWARDING

(71) Applicant: Beijing Zitiao Network Technology Co., Ltd., Beijing (CN)

(72) Inventors: Dayong Shen, Beijing (CN); Haohao Kang, Beijing (CN); Jian Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/999,685

(22) Filed: Dec. 23, 2024

(65) Prior Publication Data

US 2025/0300946 A1   Sep. 25, 2025

(30) Foreign Application Priority Data

Mar. 22, 2024   (CN) .......................... 202410339244.6

(51) Int. Cl.
*H04Q 11/00* (2006.01)
*H04L 49/00* (2022.01)

(52) U.S. Cl.
CPC ......... *H04L 49/30* (2013.01); *H04Q 11/0005* (2013.01)

(58) Field of Classification Search
None
See application file for complete search history.

(56) References Cited

U.S. PATENT DOCUMENTS 6,266,168 B1 * 7/2001 Denkin ................ H04B 10/032
 398/20
6,628,613 B1 * 9/2003 Joung ..................... H04L 47/10
 370/232

(Continued)

FOREIGN PATENT DOCUMENTS

CN      1852224 A    10/2006
CN    103684965 A     3/2014

(Continued)

OTHER PUBLICATIONS

Rajput, R. K., Basic Electrical and Electronics Engineering, 2006, pp. 640-641 (Year: 2006).*

(Continued)

*Primary Examiner* — Jai M Lee
(74) *Attorney, Agent, or Firm* — BakerHostetler

(57) ABSTRACT

Embodiments of the disclosure provide a device, method, apparatus and computer readable storage medium for forwarding data. A switching device includes: one or more sets of uplink ports, configured to be coupled with a first external interface to transmit data with an upstream device via the first external interface; one or more sets of downlink ports, configured to be coupled with a second external interface to transmit data with a downstream device via the second external interface; a data switching chip, comprising a plurality of forwarding units, each forwarding unit of the plurality of forwarding units adapted to be connected to at least one set of uplink ports of the one or more sets of uplink ports and at least one set of downlink ports of the one or more sets of downlink ports; and a control unit configured to control data forwarding of the data switching chip.

13 Claims, 4 Drawing Sheets

(56) References Cited

U.S. PATENT DOCUMENTS

| | | | | |
|---|---|---|---|---|
| 6,882,799 | B1* | 4/2005 | Beshai | H04Q 11/0005 398/47 |
| 7,366,370 | B2* | 4/2008 | Goodwill | H04B 10/801 398/79 |
| 8,189,476 | B1* | 5/2012 | Rothstein | H04L 43/0888 370/235 |
| 9,246,748 | B2* | 1/2016 | Duan | H04J 3/1652 |
| 9,282,384 | B1* | 3/2016 | Graves | H04Q 11/0005 |
| 9,398,354 | B2* | 7/2016 | Hess | H04L 49/357 |
| 10,476,815 | B2* | 11/2019 | Frankel | H04L 47/12 |
| 12,192,121 | B2* | 1/2025 | DiFerdinando | H04L 45/745 |
| 2001/0024305 | A1* | 9/2001 | Nishimoto | H04Q 11/0005 398/79 |
| 2002/0122225 | A1* | 9/2002 | Rappaport | H04Q 11/0005 398/34 |
| 2005/0031348 | A1* | 2/2005 | Choi | H04Q 11/0067 398/59 |
| 2010/0118867 | A1* | 5/2010 | Zang | H04L 49/1515 370/359 |
| 2015/0043905 | A1* | 2/2015 | Graves | H04Q 11/0005 398/45 |
| 2021/0216376 | A1 | 7/2021 | Zhang et al. | |
| 2022/0321498 | A1 | 10/2022 | DiFerdinando | |

FOREIGN PATENT DOCUMENTS

| | | |
|---|---|---|
| CN | 111092773 A | 5/2020 |
| CN | 116501681 A | 7/2023 |
| WO | WO 2022/261832 A1 | 12/2022 |

OTHER PUBLICATIONS

Zhang, Kerry, 40G/100G Implementation Technology Overview, 2016 (Year: 2016).*

Medhi, Von Neumann Architecture, 2012 (Year: 2012).*

International Patent Application No. PCT/CN2024/141768, International Search Report dated Apr. 15, 2025, 5 pages with machine translation.

* cited by examiner

DATA FORWARDING

CROSS-REFERENCE

This application claims priority to Chinese Patent Application No. 202410339244.6, filed on Mar. 22, 2024, and entitled 'DEVICE, METHOD, APPARATUS, AND STORAGE MEDIUM FOR FORWARDING DATA', which is incorporated herein by reference in its entirety.

FIELD

Example embodiments of the present disclosure generally relate to the field of electrical devices, and in particular, to data forwarding.

BACKGROUND

With the rapid development of artificial intelligence and machine learning technologies, the requirements for High Performance Computing (HPC) networks have become more stringent in terms of greater bandwidth and reduced latency. To cope with these demands, network devices have evolved, with switching capacity increasing from 25.6 T to 51.2 T and port rates increasing from 400G to 800G. However, this evolution has introduced significant challenges in terms of thermal and power design. The use of Linear Pluggable Optical (LPO) modules has been proposed as a sustainable alternative to traditional pluggable optical modules with Digital Signal Processing (DSP). The benefits of LPO modules have attracted a lot of attention in the last two years. LPO module applications offer significant benefits, including up to 50 percent lower power consumption for optical modules, 60 to 90 nanoseconds lower latency, and cost savings of about 30 percent. In addition, they can retain the convenience of pluggable modules and are supported by an established industrial supply chain. Nonetheless, significant challenges remain in integrating LPO systems into HPC core switch systems.

SUMMARY

In a first aspect of the present disclosure, a switching device is provided. The switching device includes: o one or more sets of uplink ports, configured to be coupled with a first external interface to transmit data with an upstream device via the first external interface; one or more sets of downlink ports, configured to be coupled with a second external interface to transmit data with a downstream device via the second external interface; a data switching chip, including a plurality of forwarding units, each forwarding unit of the plurality of forwarding units adapted to be connected to at least one set of uplink ports of the one or more sets of uplink ports and at least one set of downlink ports of the one or more sets of downlink ports; and a control unit, configured to control data forwarding of the data switching chip, to cause each forwarding unit of the plurality of forwarding units to forward data between the connected at least one set of uplink ports and the connected at least one set of downlink ports.

In a second aspect of the present disclosure, a method for forwarding data is provided. The method includes: obtaining a connection relationship between a plurality of forwarding units of a data switching chip and one or more sets of uplink ports as well as one or more sets of downlink ports; and controlling data forwarding of the data switching chip according to the connection relationship, to cause each forwarding unit of the plurality of forwarding units to forward data between the connected uplink port and the connected downlink port.

In a third aspect of the present disclosure, an apparatus for forwarding data is provided. The apparatus includes: an obtaining module configured to obtain a connection relationship between a plurality of forwarding units of a data switching chip and one or more sets of uplink ports as well as one or more sets of downlink ports; and a forwarding control module configured to control data forwarding of the data switching chip according to the connection relationship, to cause each forwarding unit of the plurality of forwarding units to forward data between the connected uplink port and the connected downlink port.

In a fourth aspect of the present disclosure, a computer-readable storage medium having a computer program stored thereon is provided. The computer program is executable by a processor to implement the method according to the second aspect of the present disclosure.

It would be appreciated that the content described in this content section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Embodiments of the present disclosure will be described in more detail below with reference to the accompanying drawings. While certain embodiments of the present disclosure are shown in the accompanying drawings, it would be appreciated that the present disclosure may be implemented in various forms and should not be construed as limited to the embodiments set forth herein. Rather, these embodiments are provided for a more thorough and complete understanding of the present disclosure. It would be appreciated that the drawings and embodiments of the present disclosure are for example purposes only and are not intended to limit the scope of the present disclosure.

In the description of the embodiments of the present disclosure, the terms 'including' and the like would be appreciated to include 'including but not limited to'. The term 'based on' would be appreciated as 'based at least in part on'. The terms 'one embodiment' or 'the embodiment' would be appreciated as 'at least one embodiment'. The term 'some embodiments' would be appreciated as 'at least some embodiments'. Other explicit and implicit definitions may also be included below. The terms 'first,' 'second,' and the like may refer to different or identical objects. Other explicit and implicit definitions may also be included below.

In the Leaf-Spine architecture of a Data Communication Network (DCN) or HPC network a switch may serve as a network switching device, providing data forwarding and switching functions. The switch may utilize Linear-direct-drive Pluggable Optics (LPO) modules. The LPO module removes a DSP appliance and maintains the form of a pluggable module while offering certain advantages in terms of cost, power consumption, and latency. As a result, as an example, a switch with a single chip may achieve a capacity of 51.2 T through 64 800G ports.

Traditionally, within a network switching device, a converted transmission of uplink port data to downlink port data may be realized by means of a data switching chip. If there is too much data to be forwarded, it can cause congestion in the data channel inside the network switching device, which may lead to an increase in data latency. If the cached data exceeds the cache capacity, it may also lead to problems such as data loss. In addition, the data transmission path between the chip and the port of the switch generates data transmission loss, which becomes a bottleneck in the performance of the data communication link.

Embodiments of the present disclosure provide a printed circuit board (PCB) wiring design solution such that each forwarding unit of a plurality of forwarding units of a data switching chip is connected to at least one set of uplink ports and one set of downlink ports, thereby effectively avoiding data congestion due to an excessively large amount of data flow within the chip.

Figure 1:
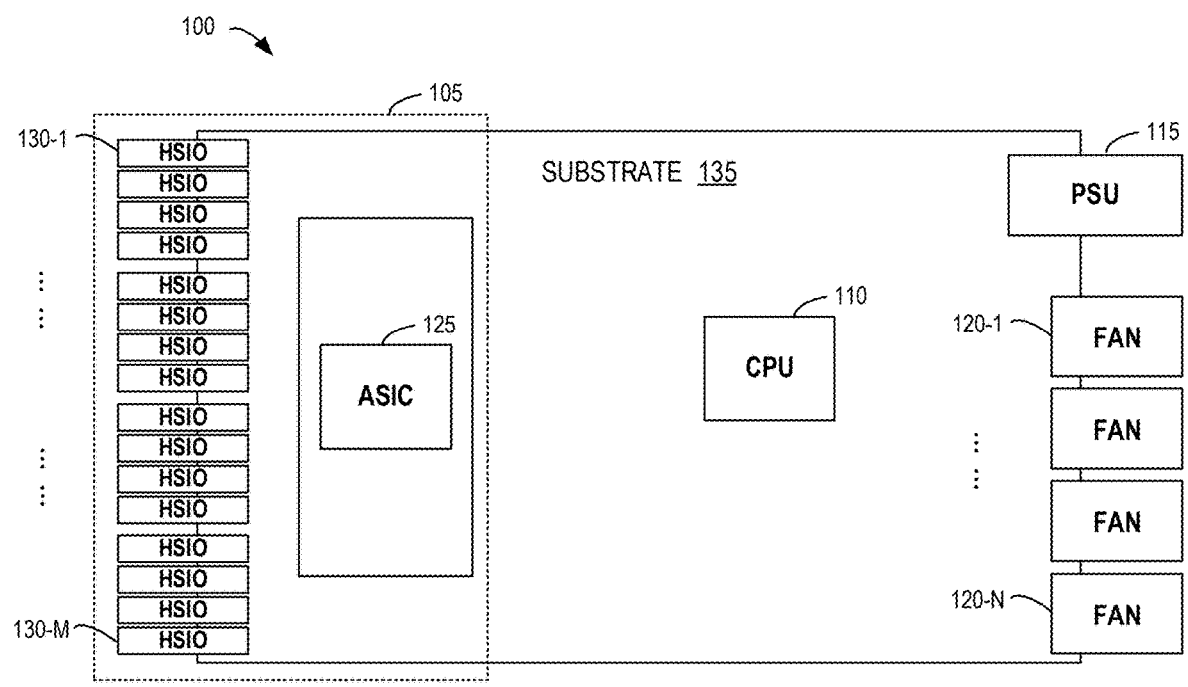
FIG. 1 illustrates an architecture of a switching device according to some embodiments of the present disclosure.

FIG. 1 illustrates an architecture of a switching device 100 according to some embodiments of the present disclosure. As shown in FIG. 1, the switching device 100 includes a data switching unit 105, a control unit 110, a power supply unit 115 (e.g., a PSU), and fans 120-1 to 120-N. The data switching unit 105 includes a data switching chip 125 (e.g., an application specific integrated circuit, ASIC) and a plurality of ports 130-1 to 130-M, for example, high speed input/output (HSIO) ports. N and M represent positive integers. The switching device 100 may be coupled to a plurality of optical modules (not shown), such as LPO modules, through the ports 130-1 through 130-M. The switching device 100 also includes a substrate 135 that is adapted for the ports 130-1 to 130-M, the data switching chip 125, and the control unit 110 to be disposed thereon.

Figure 2:
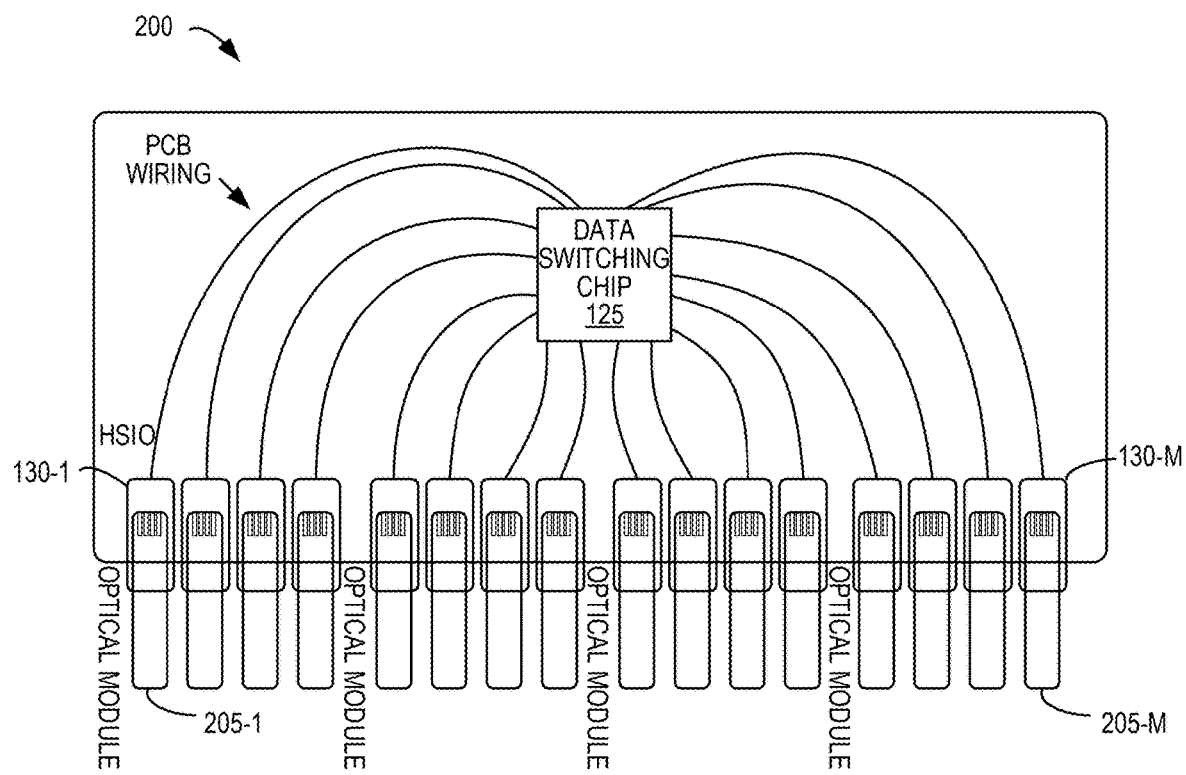
FIG. 2 illustrates an example PCB wiring arrangement between a data switching chip and a port within a switching device according to some embodiments of the present disclosure.

FIG. 2 illustrates a PCB routing arrangement 200 between a switching device internal data switching chip and ports in accordance with some embodiments of the present disclosure. As shown in FIG. 2, the wirings are sequentially fanned out from above the data switching chip 125, connected to the ports 130-1 to 130-M, and each port is coupled to one of optical modules 205-1 to 205-M (e.g., LPO modules). The ports 130-1 to 130-M may be individually or collectively referred to as ports 130, which may be configured with different bandwidths and/or different signal rates according to actual requirements.

For example, ports 130-1 to 130-M may include a port: 400G port with 8 lanes inside, each lane supporting 50G; 40G ports with 4 lanes inside, each with 10G; 10G ports with 1 10G lanes inside. The number of ports may be configured according to chip bandwidth, port bandwidth, port type, and the like.

Figure 3:
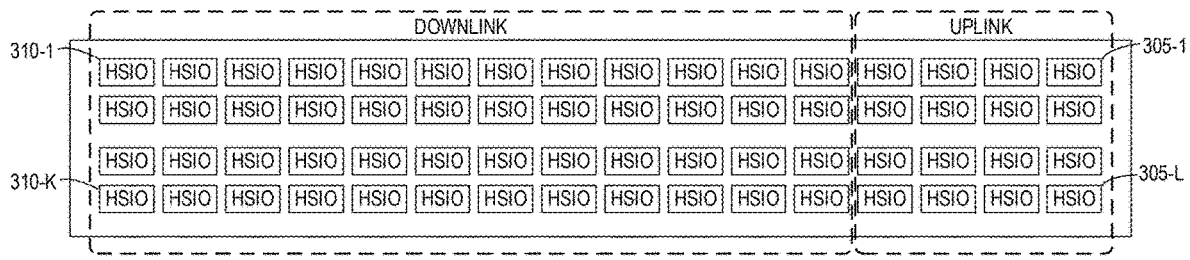
FIG. 3 illustrates an example configuration of uplink and downlink ports according to some embodiments of the present disclosure.

FIG. 3 illustrates an example configuration 300 of uplink and downlink ports according to some embodiments of the present disclosure. As shown in FIG. 3, the ports 130-1 to 130-M of the switching device are divided into uplink ports 305-1 to 305-L (individually or collectively referred to as uplink ports 305) and downlink ports 310-1 to 310-K (individually or collectively as downlink ports 310), where L and K are positive integers. An uplink port 305 is configured to communicate data with an upstream device (for example, an upper-level switching device), and a downlink port 310 is configured to communicate data with a downstream device (for example, a server or a lower-level switching device). Through the uplink ports 305 and the downlink ports 310, the switching device 100 may forward data (also referred to as uplink data) from the upstream device(s) to the downstream device(s) and forward data (also referred to as downlink data) from the downstream device(s) to the upstream device(s).

The number of the uplink ports 305 and the number of the downlink ports 310 may be configured according to a predetermined proportion of the uplink and downlink ports. For example, the switching device 100 has M=64 ports. If the predetermined ratio is 3:1, the uplink ports 305 include 16 ports, and the downlink port 310 includes 48 ports. The ratio may be configured according to actual data service requirements and network architecture and deployment.

Figure 4:
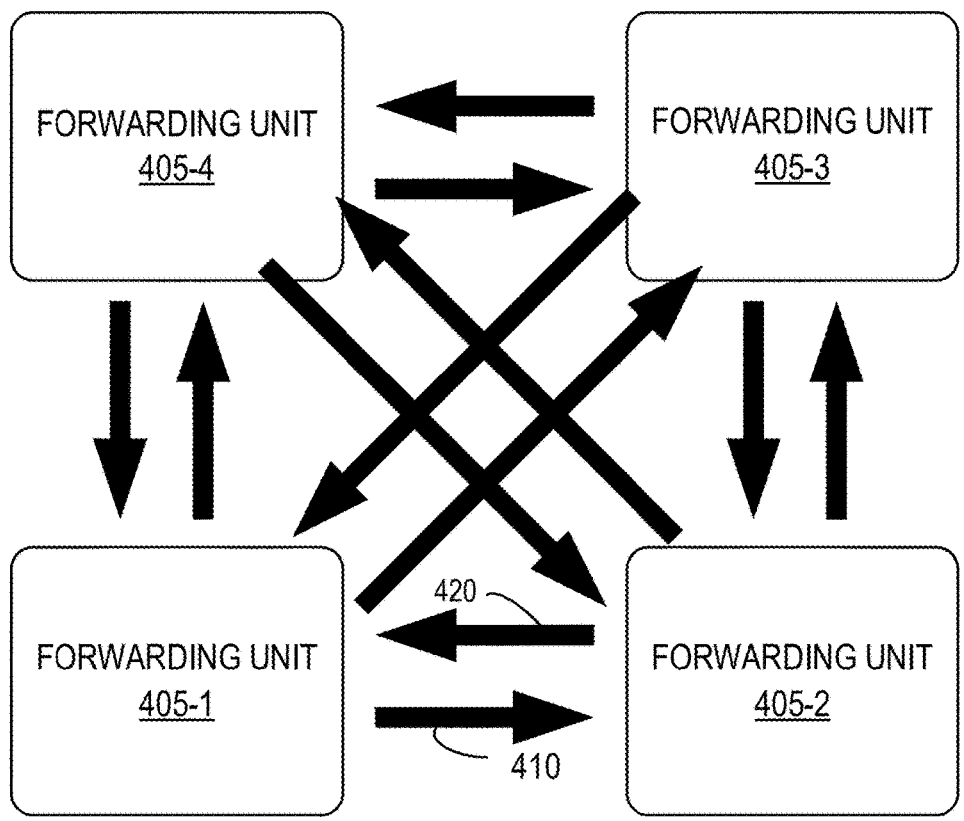
FIG. 4 illustrates a data forwarding process within a switching device according to some embodiments of the present disclosure.

FIG. 4 illustrates a data forwarding process 400 within the switching device according to some embodiments of the present disclosure. As shown in FIG. 4, the data switching chip 125 includes a plurality of forwarding units, for example, forwarding units 405-1 to 405-4. Data transmission may be performed between the forwarding units through the data forwarding channels. The data forwarding channels may include a downlink channel 410 and an uplink channels 420. For example, the downlink data arriving at the forwarding unit 405-1 through the downlink port may be transmitted to the forwarding unit 405-2 through the downlink channel 410 between the forwarding unit 405-1 and the forwarding unit 405-2, where the forwarding unit 405-2 transmit the downlink data to its upstream device through its uplink port. Similarly, the uplink data arriving at the forwarding unit 405-2 through the uplink port may be transmitted to the forwarding unit 405-1 through the uplink channel 420 between the forwarding unit 405-1 and the forwarding unit 405-2, where the forwarding unit 405-1 transmits the uplink data to its downstream device through its downlink port.

It would be appreciated that the number of forwarding units shown in FIG. 4 is merely an example, and is not a limitation. The data switching chip 125 may include any number of forwarding units according to actual requirements. The number of forwarding units may be configured according to actual data forwarding requirements and network planning and deployment.

Figure 5:
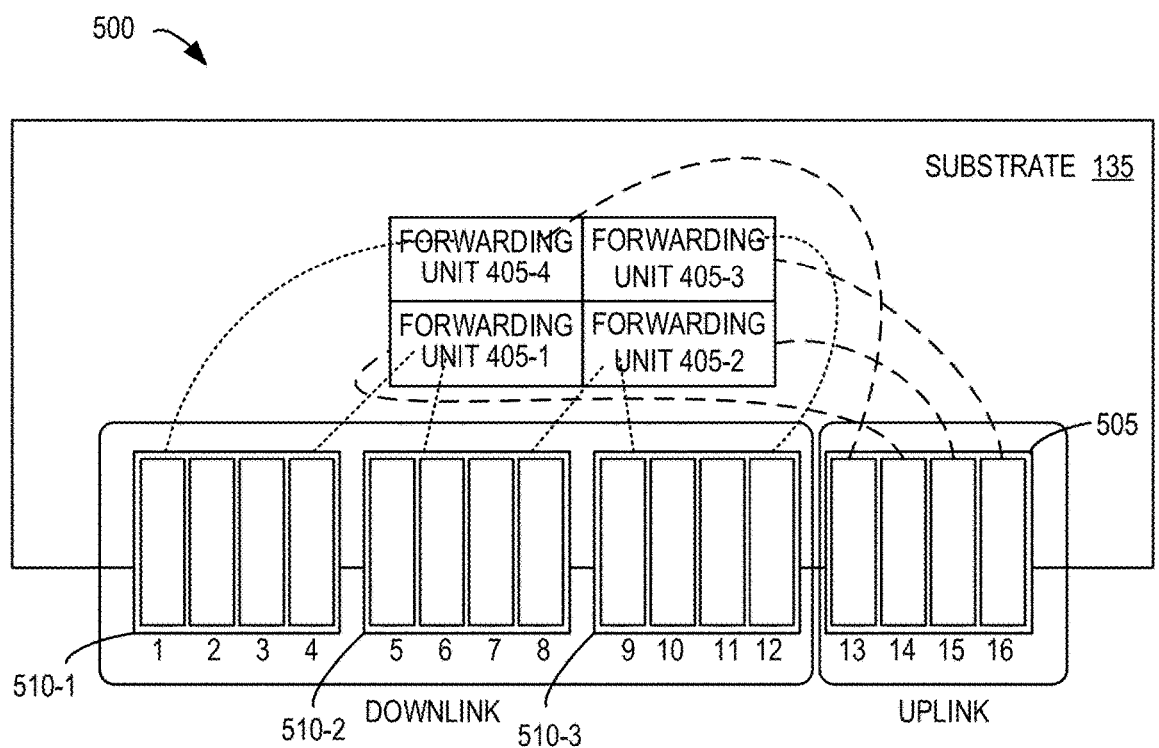
FIG. 5 illustrates an example connection arrangement between a data switching chip and a port according to some embodiments of the present disclosure.

FIG. 5 illustrates an example connection arrangement 500 between the data switching chip and ports according to some embodiments of the present disclosure.

In the arrangement 500, both the uplink ports and the downlink ports are divided into one or more sets. Each set may include the same or different number of ports. As shown in FIG. 5, the uplink ports are divided into a set of uplink ports 505 configured to couple with a first external interface (not shown) to communicate data with an upstream device (e.g., an upper-level switching device) via a first external interface. The downlink ports are divided into three sets of downlink ports 510-1, 510-2, and 510-3, which are configured to couple with second external interfaces (not shown) to communicate data with downstream devices (e.g., servers or lower-level switching devices) via the second external interfaces. Each set of uplink ports or downlink ports includes 4 ports. For ease of discussion, one or more sets of uplink ports are separately or collectively referred to as uplink port set(s) 505, and one or more sets of downlink ports are separately or collectively referred to as downlink port set(s) 510. One or more sets of uplink ports 505 and one or more sets of downlink ports 510 are adapted to couple with a plurality of optical modules (e.g., LPO modules).

It would be appreciated that the number of sets divided by the uplink and downlink ports shown in FIG. 5 and the number of ports included in each set of ports are merely examples, without suggesting any limitation. The uplink ports and the downlink ports may be divided into any number of uplink ports and downlink ports according to actual requirements. A set of ports may include any number of ports, and the number of ports in each set may be the same or different.

The data switching chip 125 includes a plurality of forwarding units, for example, four forwarding units 405-1 to 405-4 as shown in FIG. 5. Each of the forwarding unit 405-1 to 405-4 is adapted to connect to at least one set of uplink ports 505 among the one or more sets of uplink ports and at least one set of downlink ports 510 among the one or more sets of downlink ports. For example, the substrate 135 of the switching device 100 is adapted for one or more sets of uplink ports 505, one or more sets of downlink ports 510, the data switching chip 120, and the control unit 110 to be disposed thereon. Each set of uplink ports 505 and each set of downlink ports 510 may be coupled to a corresponding forwarding unit 405 via a first transmission path and a second transmission path on the substrate 135 in the switching device 100, respectively. In some embodiments, the number of the plurality of forwarding units may be greater than or equal to the set number of one or more sets of uplink ports and greater than or equal to the set number of one or more sets of downlink ports.

For example, it is assumed that the chip bandwidth is XT, the uplink bandwidth is YT and the downlink bandwidth is ZT, then:

Number of downlink ports×bandwidth of downlink ports is: port N1×AT,
Number of uplink ports×bandwidth of uplink ports is: port N2×BT,
Port total bandwidth=port N1×AT+Port N2×BT=YT+ZT=XT.

In some embodiments, port N1×AT≥Port N2×BT.

It is assumed that the number of forwarding units in the data switching chip 125 is one. In some embodiments, X≥port N1, and X≥port N2.

The following connection relationships between the uplink and downlink ports and respective forwarding units may be configured. The downlink ports #1 to #3 and the uplink port #13 are connected to the forwarding unit 405-4, the downlink ports #4 to #6 and the uplink port #14 are connected to the forwarding unit 405-1, the downlink ports #7 to #9 and the uplink port #15 are connected to the forwarding unit 405-2, and the downlink ports #10 to #1 and the uplink port #16 are connected to the forwarding unit 405-3.

The control unit 110 in the switching device 100 is configured to control data forwarding of the data switching chip 125 such that each of the plurality of forwarding units 405-1 to 405-4 forwards data between the connected at least one set of uplink ports 505 and the at least one set of downlink ports 510.

In this way, the volume of data forwarded between the downlink channel and the uplink channel between the forwarding units can be effectively reduced. In addition, if the volume of forwarded data between some forwarding units is relatively large, the data forwarding may be performed by using the idle uplink and downlink ports through the data forwarding channel between the forwarding units, thereby effectively alleviating data congestion.

In some embodiments, the control unit 110 may be further configured to, in response to determining that a data transmission volume per unit time of the first set of uplink ports connected to a first forwarding unit (for example, the forwarding unit 405-1) in the one or more sets of uplink ports 505 is greater than a threshold transmission volume, enable the data to be transmitted through a second set of uplink ports connected to an adjacent second forwarding unit (for example, the forwarding unit 405-2). The threshold transmission volume may be determined according to a threshold data forwarding volume per unit time of the plurality of forwarding units (e.g., the forwarding units 405-1 to 405-4). The threshold data forwarding volume may depend on the bandwidth supported by the data forwarding chip 120. In this way, the utilization rate of the internal bus of the chip can be improved, so that the bandwidth utilization rate of the chip can be improved.

In some embodiments, the data switching chip 125 is arranged on the substrate 135 such that a length(s) of the first transmission path between the data switching chip 125 and the at least one set of uplink ports 505, and a length(s) of the second transmission path between the data switching chip 125 and the at least one set of downlink ports 510 are all less than a predetermined threshold. In this way, the data transmission path between the data switching chip 125 and a port can be effectively shortened, thereby enhancing the signal quality and data transmission reliability in the system, and improving data transmission performance and efficiency.

Figure 6:
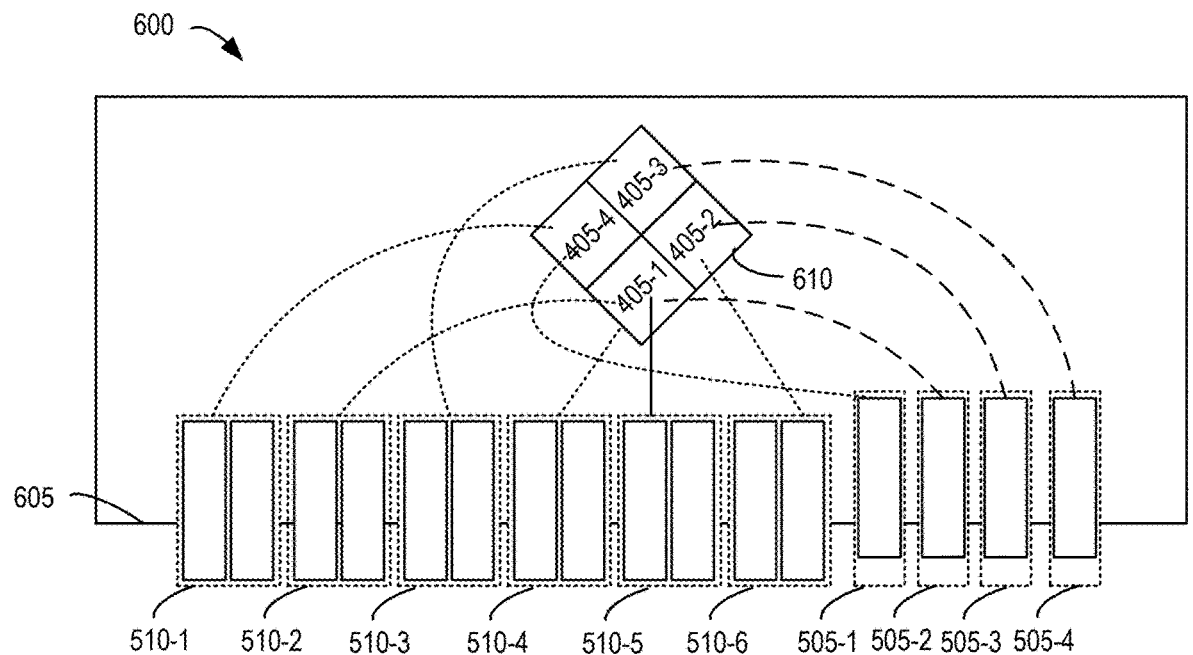
FIG. 6 illustrates a further example connection arrangement between a data switching chip and a port according to some further embodiments of the present disclosure.

FIG. 6 illustrates another example connection arrangement 600 between a data switching chip and a port according to some further embodiments of the present disclosure.

In the arrangement 600, the uplink ports are divided into four sets, and each set of uplink ports 505 includes one uplink port. The downlink ports are divided into 6 sets, and each set of downlink ports 510 includes two downlink ports. The first set of downlink ports 510-1 are connected to the forwarding unit 405-4 with the first set of uplink ports 505-1. The second set of downlink ports 510-2, the fourth set of downlink ports 510-4, and the fifth set of downlink ports 510-5 are connected to the forwarding unit 405-1 with the second set of uplink ports 505-2. The sixth set of downlink ports 510-6 and the third set of uplink ports 505-3 are connected to the forwarding unit 405-2. The third set of downlink ports 510-3 and the fourth set of uplink ports 505-4 are connected to the forwarding unit 405-3. By adjusting the outgoing line sequence of the data switching chip 125, the wiring length in the PCB can be shortened.

In some embodiments, as shown in FIG. 6, one or more sets of uplink ports 505 and one or more sets of downlink ports 510 are each disposed along a first edge 605 of the substrate 135. A second edge 610 of the data switching chip 125 is with a non-zero angle, such as 45 degrees, from the first edge 605. By adjusting the arrangement angle of the data switching chip 125, the wiring length in the PCB can be further shortened, thereby further enhancing the signal quality in the system and the reliability of data transmission.

Figure 7:
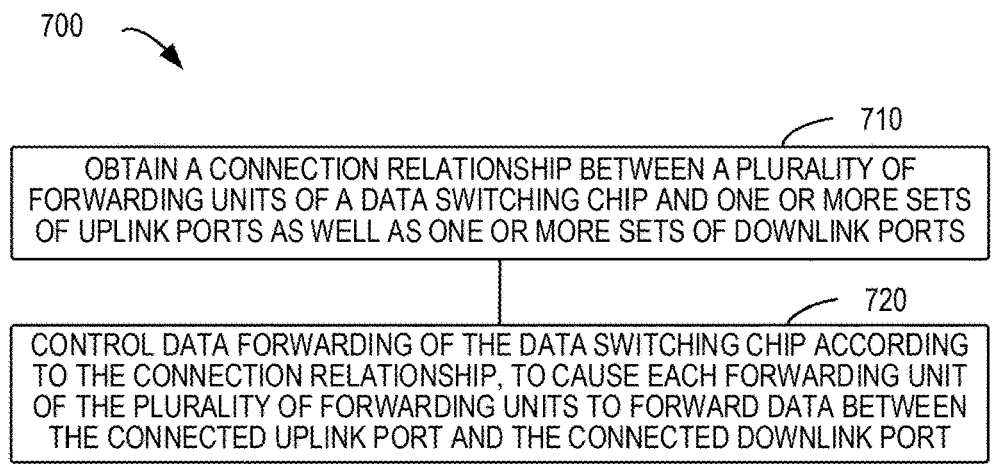
FIG. 7 shows a flowchart of a process for forwarding data according to some embodiments of the present disclosure.

A flowchart of a process 700 for forwarding data is described below with reference to FIG. 7. The process 700 may be performed by the switching device described above, for example, by the control unit 110 in the switching device.

At block 710, a connection relationship between a plurality of forwarding units 405 of a data switching chip 125 and one or more sets of uplink ports 505 as well as one or more sets of downlink ports 110 is obtained.

At block 720, data forwarding of the data switching chip 125 is controlled according to the connection relationship, to cause each forwarding unit of the plurality of forwarding units to forward data between the connected uplink port and the connected downlink port.

In some embodiments, the process 700 may further include: in response to determining that a data transmission volume per unit time of a first set of uplink ports connected to a first forwarding unit among the one or more sets of uplink ports is greater than threshold transmission volume, causing data to be transmitted via a second set of uplink ports connected to an adjacent second forwarding unit.

In some embodiments, the process 700 may further include: determining the threshold transmission volume according to threshold data forwarding volume per unit time of each forwarding unit of the plurality of forwarding units.

In some embodiments, a number of the plurality of forwarding units is greater than or equal to a number of sets of the one or more sets of uplink ports and is greater than or equal to a number of sets of the one or more sets of downlink ports.

Figure 8:
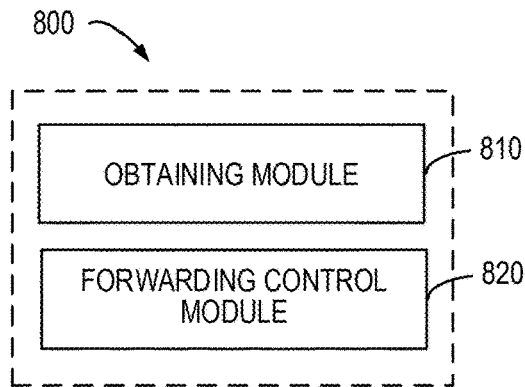
FIG. 8 is a schematic structural block diagram of an apparatus for forwarding data according to some embodiments of the present disclosure.

FIG. 8 is a schematic structural block diagram of an apparatus 800 for data forwarding according to some embodiments of the present disclosure. The apparatus 800 may be implemented at the switching device 100 of FIG. 1. The various modules/components in the apparatus 800 may be implemented by hardware, software, firmware, or any combination thereof.

As shown in FIG. 8, the apparatus 800 includes an obtaining module 810 configured to obtain a connection relationship between a plurality of forwarding units 405 of a data switching chip 125 and one or more sets of uplink ports 505 as well as one or more sets of downlink ports 110. The apparatus 800 further includes a forwarding control module 820 configured to control data forwarding of the data switching chip 125 according to the connection relationship, to cause each forwarding unit of the plurality of forwarding units to forward data between the connected uplink port and the connected downlink port.

In some embodiments, the apparatus 800 may further include a connection changing module configured to, in response to determining that a data transmission volume per unit time of a first set of uplink ports connected to a first forwarding unit among the one or more sets of uplink ports is greater than threshold transmission volume, cause data to be transmitted via a second set of uplink ports connected to an adjacent second forwarding unit.

In some embodiments, the apparatus 800 may further include a threshold determining module configured to determine the threshold transmission volume according to threshold data forwarding volume per unit time of each forwarding unit of the plurality of forwarding units.

In some embodiments, a number of the plurality of forwarding units is greater than or equal to a number of sets of the one or more sets of uplink ports and is greater than or equal to a number of sets of the one or more sets of downlink ports.

Figure 9:
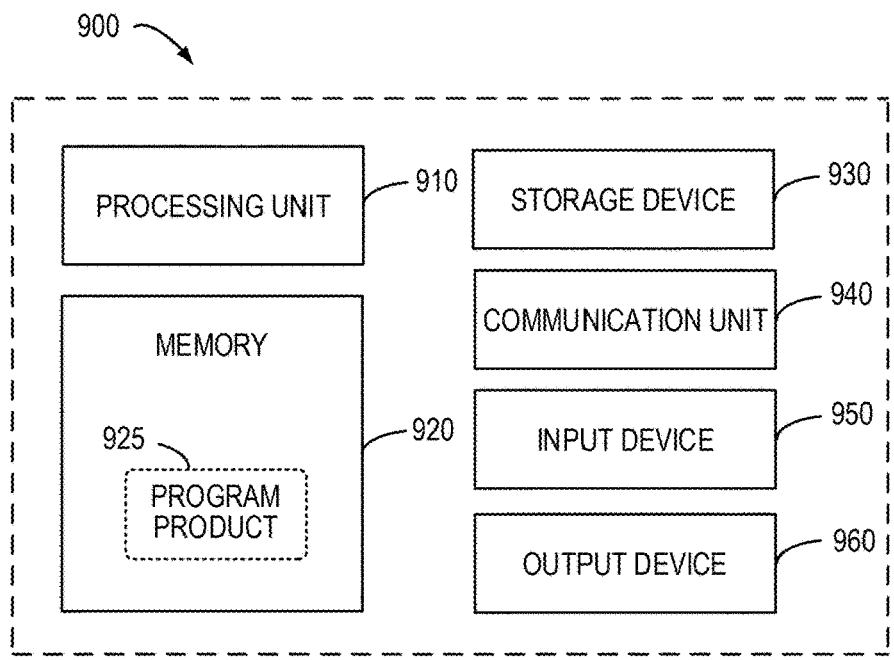
FIG. 9 illustrates a block diagram of a device capable of implementing various embodiments of the present disclosure.

FIG. 9 shows a block diagram illustrating an electronic device 900 in which one or more embodiments of the present disclosure may be implemented. It would be appreciated that the electronic device 900 illustrated in FIG. 9 is merely an example and should not constitute any limitation on the function and scope of the embodiments described herein. The electronic device 900 shown in FIG. 9 may be configured to implement the electronic device 900 in FIG. 1.

As shown in FIG. 9, the electronic device 900 is in the form of a general-purpose electronic device. Components of the electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and capable of performing various processes according to programs stored in the memory 920. In multiprocessor systems, multiple processing units execute computer-executable instructions in parallel to improve parallel processing capabilities of the electronic device 900.

The electronic device 900 typically includes a plurality of computer storage media. Such media may be any available media accessible to the electronic device 900, including, but not limited to, volatile and non-volatile media, removable and non-removable media. The memory 920 may be volatile memory (e.g., registers, caches, random access memory (RAM)), non-volatile memory (e.g., read-only memory (ROM), electrically erasable programmable read-only memory (EEPROM), flash memory), or some combination thereof. The storage device 930 may be a removable or non-removable medium and may include a machine-readable medium, such as a flash drive, magnetic disk, or any other medium, which may be capable of storing information and/or data (e.g., training data for training) and may be accessed within the electronic device 900.

The electronic device 900 may further include additional removable/non-removable, volatile/non-volatile storage media. Although not shown in FIG. 9, a disk drive for reading or writing from a removable, nonvolatile magnetic disk (e.g., a 'floppy disk') and an optical disk drive for reading or writing from a removable, nonvolatile optical disk may be provided. In these cases, each drive may be connected to a bus (not shown) by one or more data media interfaces. The memory 920 may include a computer program product 925 having one or more program modules configured to perform various methods or actions of various embodiments of the present disclosure.

The communication unit 940 is configured to communicate with a further electronic device through a communication medium. Additionally, the function of components of the electronic device 900 may be implemented as a single computing cluster or a plurality of computing machines that are capable of communicating over a communication connection. Thus, the electronic device 900 may operate in a networked environment using logical connections with one or more other servers, network personal computers (PCs), or another network node.

The input device 950 may be one or more input devices, such as a mouse, a keyboard, a trackball, or the like. The output device 960 may be one or more output devices, such as a display, a speaker, a printer, or the like. The electronic device 900 may also communicate with one or more external devices (not shown) through the communication unit 940 as needed, external devices such as storage devices, display devices, etc., communicate with one or more devices that enable a user to interact with the electronic device 900, or communicate with any device (e.g., a network card, a modem, etc.) that enables the electronic device 900 to communicate with one or more further electronic devices. Such communication may be performed via an input/output (I/O) interface (not shown).

According to example implementations of the present disclosure, a computer-readable storage medium having computer-executable instructions stored thereon is provided, wherein the computer-executable instructions are executed by a processor to implement the method described above. According to example implementations of the present disclosure, a computer program product is further provided, the computer program product being tangibly stored on a non-transitory computer-readable medium and including computer-executable instructions, the computer-executable instructions being executed by a processor to implement the method described above.

Aspects of the present disclosure are described herein with reference to flowcharts and/or block diagrams of a method, apparatus, device, and computer program product implemented according to the present disclosure. It would be appreciated that each block of the flowchart and/or block diagram, and combinations of blocks in the flowcharts and/or block diagrams, may be implemented by computer readable program instructions.

These computer-readable program instructions may be provided to the processing unit of a general-purpose computer, a special-purpose computer, or further programmable data-processing device so as to produce a machine such that the instructions, when executed through the processing unit of the computer or further programmable data-processing device, produce an apparatus that implements the functions/actions specified in one or more of the blocks in the flowchart and/or the block diagram. It is also possible to store these computer-readable program instructions in a computer-readable storage medium, which instructions cause the computer, programmable data processing apparatus and/or other device to function in a particular manner, whereby the computer-readable medium with the instructions stored then comprises an article of manufacture comprising instructions for implementing aspects of the functions/actions specified in one or more blocks in the flowchart and/or block diagram.

Computer-readable program instructions may be loaded onto a computer, a further programmable data processing apparatus, or a further device such that a series of operational steps are performed on the computer, the further programmable data processing apparatus, or the further device to produce a computer-implemented process, such that the instructions performed on the computer, the further programmable data processing apparatus, or the further device implement one of the flowcharts and/or block diagrams or a plurality of blocks to perform the function/action specified in the flowchart and/or the block diagram.

According to one or more embodiments of the present disclosure, Example 1 is a switching device including: one or more sets of uplink ports, configured to be coupled with a first external interface to transmit data with an upstream device via the first external interface; one or more sets of downlink ports, configured to be coupled with a second external interface to transmit data with a downstream device via the second external interface; a data switching chip, comprising a plurality of forwarding units, each forwarding unit of the plurality of forwarding units adapted to be connected to at least one set of uplink ports of the one or more sets of uplink ports and at least one set of downlink ports of the one or more sets of downlink ports; and a control unit, configured to control data forwarding of the data switching chip, to cause each forwarding unit of the plurality of forwarding units to forward data between the connected at least one set of uplink ports and the connected at least one set of downlink ports.

According to one or more embodiments of the present disclosure, the switching device further includes: a substrate, adapted for the one or more sets of uplink ports, the one or more sets of downlink ports, the data switching chip and the control unit to be arranged thereon, wherein each set of uplink ports and each set of downlink ports are respectively coupled to a corresponding forwarding unit via a first transmission path and a second transmission path on the substrate, and wherein the data switching chip is arranged on the substrate to cause a length of the first transmission path and a length of the second transmission path to be both less than a predetermined threshold.

According to one or more embodiments of the present disclosure, the one or more sets of uplink ports and the one or more sets of downlink ports are respectively arranged along a first edge of the substrate, and a second edge of the data switching chip is at a non-zero angle to the first edge.

According to one or more embodiments of the present disclosure, a number of the plurality of forwarding units is greater than or equal to a number of sets of the one or more sets of uplink ports and is greater than or equal to a number of sets of the one or more sets of downlink ports.

According to one or more embodiments of the present disclosure, the control unit is further configured to: in response to determining that a data transmission volume per unit time of a first set of uplink ports connected to a first forwarding unit among the one or more sets of uplink ports is greater than threshold transmission volume, cause data to be transmitted via a second set of uplink ports connected to an adjacent second forwarding unit.

According to one or more embodiments of the present disclosure, the threshold transmission volume is determined according to threshold data forwarding volume per unit time of the plurality of forwarding units.

According to one or more embodiments of the present disclosure, the one or more sets of uplink ports and the one or more sets of downlink ports are adapted to be coupled with a plurality of optical modules.

According to one or more embodiments of the present disclosure, Example 2 is a method for forwarding data, including: obtaining a connection relationship between a plurality of forwarding units of a data switching chip and one or more sets of uplink ports as well as one or more sets of downlink ports; and controlling data forwarding of the data switching chip according to the connection relationship, to cause each forwarding unit of the plurality of forwarding units to forward data between the connected uplink port and the connected downlink port.

According to one or more embodiments of the present disclosure, the method further includes: in response to determining that a data transmission volume per unit time of a first set of uplink ports connected to a first forwarding unit among the one or more sets of uplink ports is greater than threshold transmission volume, causing data to be transmitted via a second set of uplink ports connected to an adjacent second forwarding unit.

According to one or more embodiments of the present disclosure, the method further includes: determining the threshold transmission volume according to threshold data forwarding volume per unit time of each forwarding unit of the plurality of forwarding units.

According to one or more embodiments of the present disclosure, a number of the plurality of forwarding units is greater than or equal to a number of sets of the one or more sets of uplink ports and is greater than or equal to a number of sets of the one or more sets of downlink ports.

According to one or more embodiments of the present disclosure, Example 3 is an apparatus for forwarding data, including: an obtaining module, configured to obtain a connection relationship between a plurality of forwarding units of a data switching chip and one or more sets of uplink ports as well as one or more sets of downlink ports; and a forwarding control module, configured to control data forwarding of the data switching chip according to the connection relationship, to cause each forwarding unit of the plurality of forwarding units to forward data between the connected uplink port and the connected downlink port.

According to one or more embodiments of the present disclosure, Example 4 is a computer-readable storage medium, having a computer program stored thereon, the computer program being executable by a processor to implement the method according to one or more embodiments of the present disclosure.

The flowcharts and block diagrams in the accompanying drawings show the architecture, functionality, and operation of a plurality of implementations of a system, method, and computer program product that may be implemented according to the present disclosure. At this point, each block in the flowcharts or block diagrams may represent a module, program segment, or part of an instruction, and the module, program segment, or part of an instruction contains one or more executable instructions for implementing the specified logical functions. In some implementations as replacements, the functions labeled in the blocks may also occur in a different order than that labeled in the accompanying drawings. For example, two consecutive blocks may actually be performed substantially in parallel, which may sometimes be performed in the reverse order, depending on the function involved. It would also be noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various embodiments of the present disclosure have been described above, and the foregoing description is by way of example, is not exhaustive, and is not limited to the disclosed embodiments. Without departing from the scope and spirit of the illustrated implementations, many modifications and changes will be apparent to one of ordinary skill in the art. The selection of the terms used herein is intended to best explain the principles of the implementations, practical applications, or improvements to techniques in the marketplace, or to enable others of ordinary skill in the art to understand the various implementations disclosed herein.

We claim:

1. A switching device, comprising:
one or more sets of uplink ports, configured to be coupled with a first external interface to transmit data with an upstream device via the first external interface;
one or more sets of downlink ports, configured to be coupled with a second external interface to transmit data with a downstream device via the second external interface;
a data switching chip, comprising a plurality of forwarding units, each forwarding unit of the plurality of forwarding units adapted to be connected to at least one set of uplink ports of the one or more sets of uplink ports and at least one set of downlink ports of the one or more sets of downlink ports, to obtain a connection relationship between the plurality of forwarding units and the one or more sets of uplink ports as well as the one or more sets of downlink ports; and
a control unit, configured to control data forwarding of the data switching chip according to the connection relationship, to cause each forwarding unit of the plurality of forwarding units to forward data between the connected at least one set of uplink ports and the connected at least one set of downlink ports, the control unit further configured to cause data to be transmitted via a second set of uplink ports connected to an adjacent second forwarding unit in response to determining that a data transmission volume per unit time of a first set of uplink ports connected to a first forwarding unit among the one or more sets of uplink ports is greater than threshold transmission volume.

2. The switching device of claim 1, further comprising:
a substrate, adapted for the one or more sets of uplink ports, the one or more sets of downlink ports, the data switching chip and the control unit to be arranged thereon,
wherein each set of uplink ports and each set of downlink ports are respectively coupled to a corresponding forwarding unit via a first transmission path and a second transmission path on the substrate.

3. The switching device of claim 2, wherein the one or more sets of uplink ports and the one or more sets of downlink ports are respectively arranged along a first edge of the substrate, and a second edge of the data switching chip is at a non-zero angle to the first edge.

4. The switching device of claim 1, wherein a number of the plurality of forwarding units is greater than or equal to a number of sets of the one or more sets of uplink ports and is greater than or equal to a number of sets of the one or more sets of downlink ports.

5. The switching device of claim 1, wherein the threshold transmission volume is determined according to threshold data forwarding volume per unit time of the plurality of forwarding units.

6. The switching device of claim 1, wherein the one or more sets of uplink ports and the one or more sets of downlink ports are adapted to be coupled with a plurality of optical modules.

7. The switching device of claim 1, wherein the one or more sets of uplink ports and the one or more sets of downlink ports each comprise the same number of ports.

8. A method for forwarding data, comprising:
obtaining a connection relationship between a plurality of forwarding units of a data switching chip and one or more sets of uplink ports as well as one or more sets of downlink ports;

controlling data forwarding of the data switching chip according to the connection relationship, to cause each forwarding unit of the plurality of forwarding units to forward data between the connected uplink port and the connected downlink port; and in response to determining that a data transmission volume per unit time of a first set of uplink ports connected to a first forwarding unit among the one or more sets of uplink ports is greater than threshold transmission volume, causing data to be transmitted via a second set of uplink ports connected to an adjacent second forwarding unit.

9. The method of claim 8, further comprising:

determining the threshold transmission volume according to threshold data forwarding volume per unit time of each forwarding unit of the plurality of forwarding units.

10. The method of claim 8, wherein a number of the plurality of forwarding units is greater than or equal to a number of sets of the one or more sets of uplink ports and is greater than or equal to a number of sets of the one or more sets of downlink ports.

11. A non-transitory computer-readable storage medium, having a computer program stored thereon, the computer program being executable by a processor to implement acts comprising:

obtaining a connection relationship between a plurality of forwarding units of a data switching chip and one or more sets of uplink ports as well as one or more sets of downlink ports;

controlling data forwarding of the data switching chip according to the connection relationship, to cause each forwarding unit of the plurality of forwarding units to forward data between the connected uplink port and the connected downlink port; and in response to determining that a data transmission volume per unit time of a first set of uplink ports connected to a first forwarding unit among the one or more sets of uplink ports is greater than threshold transmission volume, causing data to be transmitted via a second set of uplink ports connected to an adjacent second forwarding unit.

12. The non-transitory computer-readable storage medium of claim 11, wherein the acts further comprise:

determining the threshold transmission volume according to threshold data forwarding volume per unit time of each forwarding unit of the plurality of forwarding units.

13. The non-transitory computer-readable storage medium of claim 11, wherein a number of the plurality of forwarding units is greater than or equal to a number of sets of the one or more sets of uplink ports and is greater than or equal to a number of sets of the one or more sets of downlink ports.

* * * * *